United States Patent [19]

Klein

[11] Patent Number: 5,033,600
[45] Date of Patent: Jul. 23, 1991

[54] ROLLER TRACK AND STOP THEREFOR

[75] Inventor: Herbert H. Klein, Arlington Heights, Ill.

[73] Assignee: Unarco Industries, Inc., Chicago, Ill.

[21] Appl. No.: 582,327

[22] Filed: Sep. 13, 1990

[51] Int. Cl.$^5$ .......................................... B65G 13/075
[52] U.S. Cl. .................................................... 193/35 A
[58] Field of Search .......................... 193/32, 35 A, 40; 198/463.4, 463.5, 463.6

[56] References Cited

U.S. PATENT DOCUMENTS

| | | | |
|---|---|---|---|
| 3,104,749 | 9/1963 | Sullivan | 193/35 A |
| 3,216,547 | 11/1965 | Good et al. | 193/35 A |
| 3,250,361 | 5/1966 | Bystedt | 193/35 A |
| 3,532,201 | 10/1970 | McConnell | 193/35 A |
| 3,881,585 | 5/1975 | Coleman et al. | 193/35 A |
| 4,119,190 | 10/1978 | Kornylak | 193/35 A |
| 4,219,114 | 8/1980 | Kovacs | 193/35 A X |
| 4,285,229 | 9/1981 | Keller | 193/35 A X |
| 4,540,080 | 9/1985 | Nordstrom | 193/40 |

FOREIGN PATENT DOCUMENTS 210732 1/1967 Sweden .......................... 193/35 A

OTHER PUBLICATIONS

Frados, ed., *Plastics Engineering Handbook*, 4th edition (1976)-title page, opposite page to title page, and pp. 62 and 63.

*Primary Examiner*—D. Glenn Dayoan
*Attorney, Agent, or Firm*—Dressler, Goldsmith, Shore, Sutker & Milnamow

[57] ABSTRACT

For a roller track for a storage rack arranged for gravitational flow of load-bearing pallets, an elongate stop having a hooked end and being made from a polycaprolactum (nylon 6) of a suitable grade having a tensile strength of at least about 11,800 psi, a modulus of at least about 400,000 in flexure, and an impact strength of at least about 1 foot-pound per inch of notch in the Izod test. A roller track for such a rack comprises two parallel walls, a longitudinal array of freely rotatable rollers journalled therebetween so as to extend upwardly from a space therebetween, and such a stop mounted therebetween, at a lower end of the roller track, so that the hooked end points upwardly.

6 Claims, 1 Drawing Sheet

ROLLER TRACK AND STOP THEREFOR

TECHNICAL FIELD OF THE INVENTION

This invention pertains to a roller track for a storage rack arranged for gravitational flow of load-bearing pallets. This invention provides an improved stop in and for such a roller track.

BACKGROUND OF THE INVENTION

Typically, as used in a storage rack arranged for gravitational flow of load-bearing pallets, a roller track having a slight inclination (e.g. 3°) relative to a horizontal plane comprises two walls disposed in parallel relation to each other, a longitudinal array of freely rotatable rollers journalled between the walls in such manner that the rollers extend upwardly from a space therebetween, and an elongate stop having a hooked end. The elongate stop is mounted to and between the walls, at a lower end of the roller track, in such manner that the hooked end points upwardly. The elongate stop may be so oriented as to impart frictional drag tending to slow a load-bearing pallet approaching the hooked end. In such a storage rack, in each lane on each level, it is conventional to employ two roller tracks disposed in parallel relation to each other and at a slight inclination relative to a horizontal plane. Such storage racks are available commercially from Unarco Material Handling (a unit of UNR Industries, Inc.) of Chicago, Ill.

Commonly, the elongate stop is made from cast iron, which has sufficient strength to withstand repeated impacts of load-bearing pallets slamming into the hooked end. A disadvantage of cast iron is that cast iron is not sufficiently shock-absorbing. Consequently, when a pallet bearing a load slams into the hooked end of such a stop made from cast iron, there are tendencies for parts of the load to shift excessively or to fall from the pallet. Aluminum, which is less expensive to fabricate into such a stop, has been tried but has been found not to be sufficiently shock-absorbing and to be unduly susceptible to breakage. Various polymeric materials, which could have been more shock-absorbing, have been tried but have been found to be unduly susceptible to breakage.

Thus, there has been a need for an improved stop for a roller track, as discussed above.

SUMMARY OF THE INVENTION

This invention provides an improved stop for a roller track for a storage rack arranged for gravitational flow of load-bearing pallets.

The improved stop is similar to stops known or tried heretofore in being elongate and in having a hooked end. However, the improved stop is different from stops known or tried heretofore in being made from a specially selected, polymeric material, rather than from cast iron or aluminum.

The polymeric material of the improved stop is selected to have certain properties, namely a tensile strength of at least about 11,800 pounds per square inch, a modulus of at least about 400,000 pounds per square inch in flexure, and an impact strength of at least about 1 foot-pound per inch of notch in the Izod test.

Preferably, the polymeric material is a polyamide (nylon) of a suitable type and of a suitable grade. More preferably, the polymeric material is a polycaprolactum (nylon 6) of a suitable grade.

Thus, for a storage rack arranged for gravitational flow of load-bearing pallets, a roller track embodying this invention comprises two walls disposed in parallel relation to each other, a longitudinal array of freely rotatable rollers journalled between the walls in such manner that the rollers extend upwardly from a space between the walls, and the improved stop. The rollers have axes defining a plane having a slight inclination relative to a horizontal plane. The improved stop is mounted between the walls, at a lower end of the roller track, in such manner that the hooked end of the improved stop extends upwardly.

Advantageously, the polymeric material selected for the improved stop not only has sufficient strength to withstand repeated impacts of load-bearing pallets slamming against the hooked end of the improved stop but also has suitable properties to absorb resultant shocks, thereby to minimize tendencies of parts of a load on a pallet slamming into the hooked end of the improved stop to shift excessively or to fall from the pallet.

These and other objects, features, and advantages of this invention are evident from the following description of a preferred embodiment of this invention with reference to the accompanying drawings.

BRIEF DESCRIPTION OF THE DRAWINGS

FIG. 2 illustrates two problems associated with elongate stops known or tried previously.

DETAILED DESCRIPTION OF PREFERRED EMBODIMENTS

Figure 1:
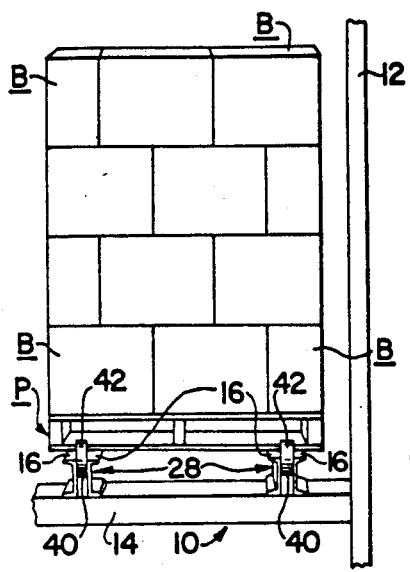
FIG. 1 is a front view of one lane on one level of a storage rack arranged for gravitational flow of load-bearing pallets. One such pallet is shown on two roller tracks.
Figure 2:
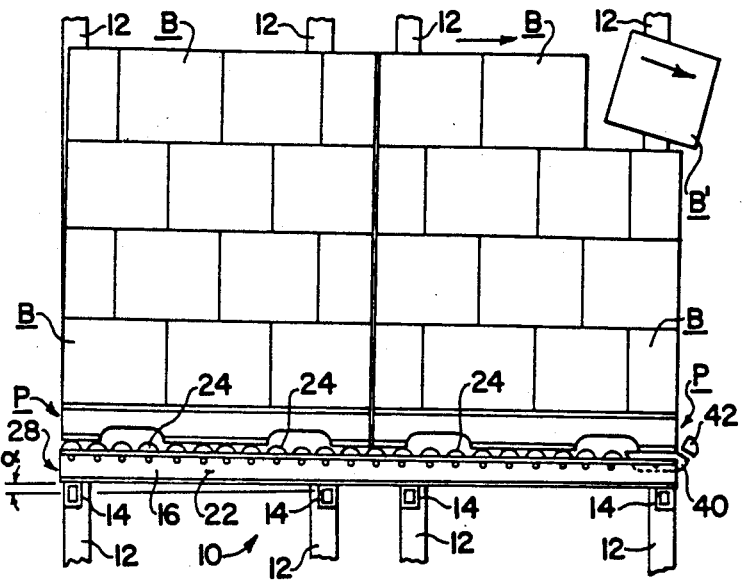
FIG. 2 is a side view of the storage rack of FIG. 1. Two such pallets are shown.

As shown in FIGS. 1 and 2, a storage rack 10 of a type wherein this invention can be advantageously embodied is arranged for gravitational flow of pallets P bearing loads of stacked boxes B. The storage rack 10 is a bolted or welded structure comprising structural steel members. A bolted structure is preferred when this invention is embodied in the storage rack 10. These members include upright members 12, transverse members 14, and longitudinal members 16. As indicated by an angled α in FIG. 2, each longitudinal member 16 has a slight inclination (e.g. 3°) relative to a horizontal plane.

Each longitudinal member 16 has an upper flange 18 extending in a lateral direction, a lower flange 20 extending in the same direction, and a vertical wall 22 extending between the flanges 18, 20. The longitudinal members 16 are arranged in pairs, in which the flanges 18, 20, of the respective members 16 extend oppositely and in which the walls 22 of the respective members 16 are disposed in parallel relation to each other.

The longitudinal members 16 of each pair are assembled with a longitudinal array of steel rollers 24 to provide a roller track 28. Because of the slight inclination of the longitudinal members 16, the roller track 28 has a similar inclination (e.g. 3°) relative to a horizontal plane. The roller tracks 28 are arranged in pairs with one pair of the roller tracks 28 in each lane on each level of the storage rack 10. According to conventional practice, the storage rack 10 may have multiple lanes on multiple levels.

Figure 4:
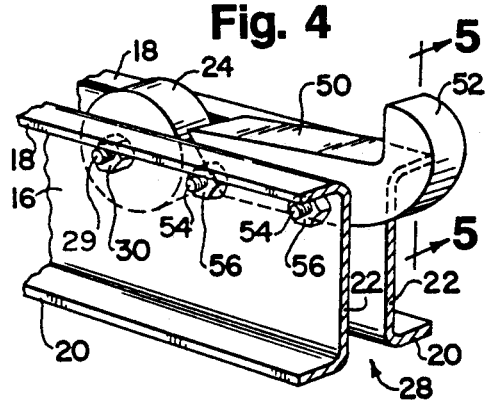
FIG. 4 is a further enlarged, fragmentary, perspective view of the lower end of the roller track, as shown in FIG. 3.

As exemplified in FIG. 4, each roller 24 is journalled, on a spindle (not shown) of such roller 24, between the walls 22 of the longitudinal members 16 assembled with such roller 24, in a manner common to storage racks known heretofore. Ball bearings (not shown) enable each roller 24 to be freely rotatable on its spindle. Bolts 29 with nuts 30 threaded thereon are used to bolt the spindles between the walls 22. The rollers may be alternatively arranged in two groups, which are journalled differently, as disclosed in a copending application filed simultaneously herewith, under Ser. No 07/582,255, and assigned commonly. The copending application is entitled "Roller Track For Storage Rack, Roller Conveyor, or Similar Apparatus."

As shown in FIGS. 1 and 2, an elongate stop 40 having a hooked end 42 is bolted between the walls 22 of the longitudinal members 16 of each roller track 28, at the lower end of such roller track 28, in such manner that the hooked end 42 extends upwardly. Cast iron is used commonly to make such a stop.

FIG. 2 suggests what can happen if the elongate stop 40 is fabricated from aluminum, which has been tried as a replacement for cast iron. Because aluminum is not sufficiently shock-absorbing, there are tendencies for part of a load to shift excessively or to fall from a pallet bearing the load, in a manner suggested by falling box B' in FIG. 2, when the pallet slams into the hooked end 42 of the elongate aluminum stop. Moreover, as suggested by the hooked end 42 breaking away in FIG. 2, there are tendencies for the elongate stop 40 to break.

If the elongate stop 40 were made from cast iron, which is used commonly to make such a stop, it also would not be significantly shock-absorbing. However, as compared to aluminum, cast iron would be less susceptible to breakage.

Figure 5:
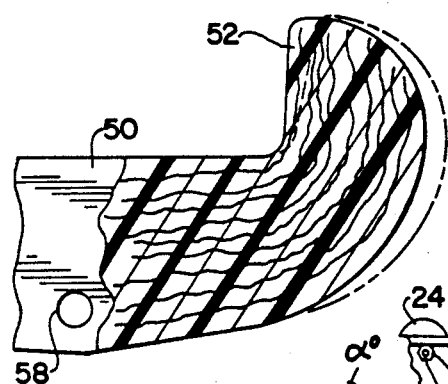
FIG. 5 is a further enlarged detail of the improved stop, as taken partly in cross-section, along line 5—5 in FIG. 4, in a direction indicated by arrows.
Figure 3:
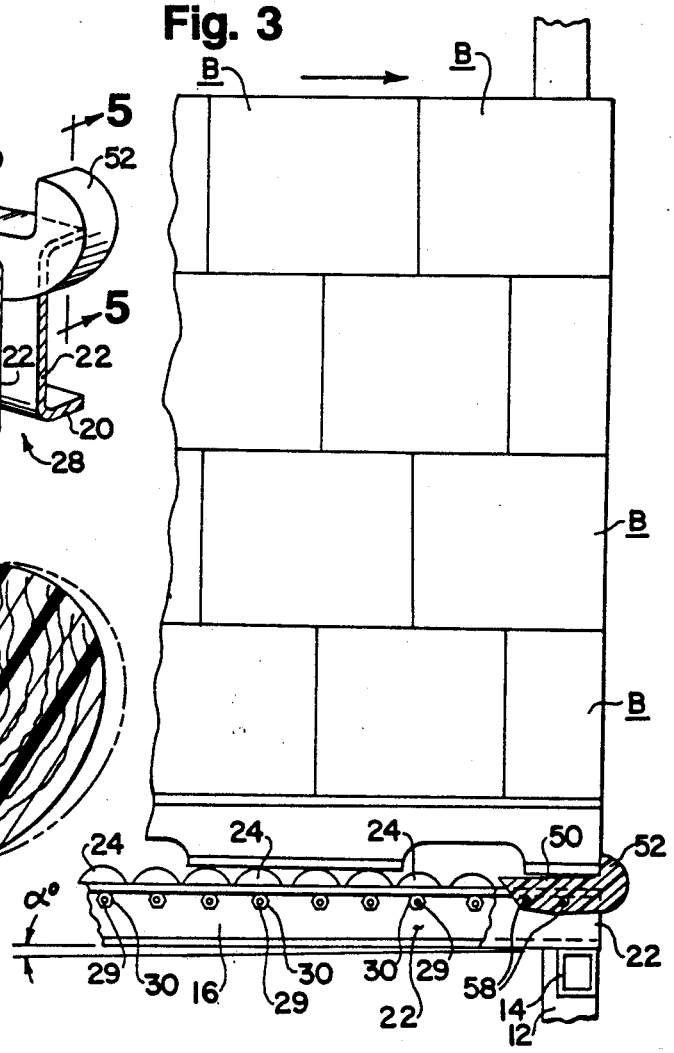
FIG. 3 is an enlarged, fragmentary, elevational view of the storage rack shown in FIG. 1, as taken from its left side. At a lower end of one roller track of the storage rack, an improved stop according to this invention is shown with its hooked end in cross-section, the improved stop having been substituted for a different stop shown in FIGS. 1 and 2.

In FIGS. 3, 4, and 5, an elongate stop 50 having a hooked end 52 has been substituted for the elongate stop 40 in a roller track 28 which is representative of the roller tracks of the storage rack 10. Bolts 54 having nuts 56 threaded thereon are used to bolt the elongate stop 50 between the walls 22 of the longitudinal members 16 of the roller track 28, at the lower end of the roller track 28, in such manner that the hooked end 52 extends upwardly. The bolts 54 are passed through apertures 58 in the elongate stop 50 and through aligned apertures (not shown) in the walls 22.

It is a characteristic feature of this invention that the elongate stop 50 is molded from a specially selected, polymeric material, namely a polycaprolactum (nylon 6) of a suitable grade having a tensile strength of at least about 11,800 psi, a modulus of at least about 400,000 psi in flexure, and an impact strength of at least about 1 foot-pound per inch of notch in the Izod test.

A preferred material is available commercially from Firestone Tire & Rubber Co., Akron, Ohio, under Resin Code CL200-001. Standard tests are used to measure tensile strength and modulus in flexure. The Izod test (ASTM D256) is described in various publications including Frados, Ed., *Plastics Engineering Handbook of the Society of the Plastics Industry, Inc.*, 4th Edition, Van Nostrand Reinhold Company, New York 1976, at page 876.

The elongate stop 50 is molded by a process wherein the polymeric material, in a pelletized form, is dried with a desiccant for approximately three hours. After the polymeric material has been sufficiently dried, a mold is heated to approximately 95° F. Next, the polymeric material, in a molten form at a temperature between about 490° F. and about 525° F., is injected into the mold. The injected material is held in the mold for up to about 100 seconds, until the injected material has solidified whereupon the solidified material is transferred to a table, on which the solidified material is allowed to cool to room temperature.

The elongate stop 50 has sufficient strength to withstand repeated impacts of load-bearing pallets slamming into the hooked end 52. The elongate stop 50 is sufficiently shock-absorbing and tends to flex resiliently, in a manner suggested in FIG. 5, when a pallet bearing a load slams into the hooked end 52.

It is contemplated by this invention, therefore, that each roller track of the storage rack 10 is provided with an elongate stop similar to the elongate stop 50.

I claim:

1. For a storage rack arranged for gravitational flow of load-bearing pallets, a roller track comprising
   (a) two walls disposed in parallel relation to each other so as to define a space between the walls,
   (b) a longitudinal array of freely rotatable rollers journalled between the walls in such manner that the rollers extend upwardly from the space between the walls, each roller having an axis and the axes defining a plane having a slight inclination relative to a horizontal plane, the roller track having an upper end and a lower end, and
   (c) an elongate stop having a hooked end and being mounted between the walls, at the lower end of the roller track, in such manner that the hooked end points upwardly, wherein the elongate stop is made from a polymeric material selected to have a tensile strength of at least about 11,800 pounds per square inch, a modulus of at least about 400,000 pounds per square inch in flexure, and an impact strength of at least about 1 foot-pound per inch of notch in the Izod test.

2. The roller track of claim 1 wherein the polymeric material is a polyamide.

3. The roller track of claim 2 wherein the polymeric material is a polycaprolactum.

4. For a roller track for a storage rack arranged for gravitational flow of load-bearing pallets, an elongate stop having a hooked end and being made from a polymeric material selected to have a tensile strength of at least about 11,800 pounds per square inch, a modulus of at least about 400,000 pounds per square inch in flexure, and an impact strength of at least about 1 foot-pound per inch of notch in the Izod test.

5. The roller track of claim 4 wherein the polymeric material is a polyamide.

6. The roller track of claim 5 wherein the polymeric material is a polycaprolactum.

* * * * *